United States Patent
Lu et al.

(10) Patent No.: US 11,934,581 B2
(45) Date of Patent: Mar. 19, 2024

(54) TERMINAL VIBRATION EVALUATION METHOD AND APPARATUS IN GAME SCENARIO, MEDIUM, AND DEVICE

(71) Applicant: Tencent Technology (Shenzhen) Company Limited, Shenzhen (CN)

(72) Inventors: Yanhui Lu, Shenzhen (CN); Kai Hong, Shenzhen (CN); Shili Xu, Shenzhen (CN); Haiyang Wu, Shenzhen (CN); Qitian Zhang, Shenzhen (CN); Jingjing Chen, Shenzhen (CN); Zhuan Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/983,310

(22) Filed: Nov. 8, 2022

(65) Prior Publication Data
US 2023/0057783 A1    Feb. 23, 2023

Related U.S. Application Data

(63) Continuation of application No. PCT/CN2022/074494, filed on Jan. 28, 2022.

(30) Foreign Application Priority Data

Feb. 5, 2021    (CN) .......................... 202110163930.9

(51) Int. Cl.
*G06F 3/01*    (2006.01)
*A63F 13/285*    (2014.01)

(52) U.S. Cl.
CPC ............ *G06F 3/016* (2013.01); *A63F 13/285* (2014.09); *G06F 2203/013* (2013.01)

(58) Field of Classification Search
CPC ..... G06F 3/016; G06F 2203/01; A63F 13/285
See application file for complete search history.

(56) References Cited

U.S. PATENT DOCUMENTS

2012/0311403 A1* 12/2012 Gladwin ............ H04N 21/2393
                                                                714/763
2018/0052012 A1*  2/2018 Nishizawa ............. G01D 3/028
(Continued)

FOREIGN PATENT DOCUMENTS

| CN | 105812567 A | 7/2016 |
| CN | 107174824 A | 9/2017 |

(Continued)

OTHER PUBLICATIONS

Tencent Technology, ISR, PCT/CN2022/074494, Mar. 7, 2022, 2 pgs.

(Continued)

*Primary Examiner* — Robert J Michaud
(74) *Attorney, Agent, or Firm* — Morgan, Lewis & Bockius LLP

(57) ABSTRACT

The present disclosure provides a terminal vibration evaluation method performed by an electronic device. The method includes: acquiring an actual vibration curve of a target terminal when a target game scenario is displayed; acquiring a predefined vibration description file associated with the target game scenario, and determining a predefined vibration curve according to the predefined vibration description file; determining target deviation data between the actual vibration curve and the predefined vibration curve; and determining, according to the target deviation data, whether vibration of the target terminal matches the target game scenario. The present disclosure provides a measurement solution used for determining whether terminal vibration matches a game scenario (for example, a game sound and a game picture), which helps improve a matching (Continued)

degree between terminal vibration and the game scenario, thereby improving a sense of substitution of the game and a sense of immersion of a player.

18 Claims, 8 Drawing Sheets

(56) References Cited

U.S. PATENT DOCUMENTS

2018/0364132 A1\* 12/2018 Knaup .................. G01H 1/003
2021/0031103 A1\* 2/2021 Wang ...................... A63F 13/24

FOREIGN PATENT DOCUMENTS

| CN | 108196669 A | 6/2018 |
| CN | 109163794 A | 1/2019 |
| CN | 109644265 A | 4/2019 |
| CN | 110296215 A | 10/2019 |
| CN | 111870934 A | 11/2020 |
| CN | 112121411 A | 12/2020 |

OTHER PUBLICATIONS

Tencent Technology, Translated Written Opinion, PCT/CN2022/074494, dated Aug. 5, 2022, 3 pgs.
Tencent Technology, Translated IPRP, PCT/CN2022/074494, Aug. 3, 2023, 4 pgs.

\* cited by examiner

TERMINAL VIBRATION EVALUATION METHOD AND APPARATUS IN GAME SCENARIO, MEDIUM, AND DEVICE

CROSS-REFERENCE TO RELATED APPLICATIONS

This application is a continuation application of PCT Patent Application No. PCT/CN2022/074494, entitled "TERMINAL VIBRATION ASSESSMENT METHOD, DEVICE, MEDIUM AND EQUIPMENT FOR GAME SCENE" filed on Jan. 28, 2022, which claims priority to Chinese Patent Application No. 202110163930.9, filed with the State Intellectual Property Office of the People's Republic of China on Feb. 5, 2021, and entitled "TERMINAL VIBRATION DETECTION METHOD AND APPARATUS IN GAME SCENARIO, MEDIUM, AND DEVICE", all of which are incorporated herein by reference in their entirety.

FIELD OF THE TECHNOLOGY

This application relates to the field of information processing technologies, and specifically, to a terminal vibration detection technology in a game scenario.

BACKGROUND OF THE DISCLOSURE

With development of a hardware technology and improvement of a network capability, smoothness and picture quality of a terminal game are greatly improved, so that a player can obtain good experience in terms of sense, vision, and interaction in a game, thereby enhancing a sense of reality, a sense of substitution, and a sense of immersion in a game. In addition, vibration is generated in a terminal with reference to a game scenario, which can stimulate a player's touch, so that the player obtains better game experience.

However, currently, vibration of a terminal device is mostly implemented in a simple feedback manner, for example, a scenario such as an incoming call reminder or an alarm clock. However, a terminal vibration evaluation method in a game scenario is not available, that is, there is no evaluation standard for a shock effect of a player's tactile feeling after vibration of the terminal device is generated.

SUMMARY

Embodiments of this application provide a terminal vibration evaluation method in a game scenario, a terminal vibration detection apparatus in a game scenario, an electronic device, and a computer readable storage medium, so as to effectively detect a terminal vibration effect in a game scenario, thereby helping to reduce deviation data in a predefined vibration description file, so that terminal vibration matches a game scenario, further improving a game immersion sense of a player.

According to an aspect of this application, a terminal vibration evaluation method in a game scenario is provided, performed by an electronic device and including: acquiring an actual vibration curve of a target terminal when a target game scenario is displayed on the target terminal; acquiring a predefined vibration description file associated with the target game scenario, and determining a predefined vibration curve according to the predefined vibration description file; determining target deviation data between the actual vibration curve and the predefined vibration curve; and determining, according to the target deviation data, whether vibration of the target terminal matches the target game scenario.

According to an aspect of this application, a terminal vibration detection apparatus in a game scenario is provided, including: an actual vibration curve acquiring module, a predefined vibration curve acquiring module, a deviation data determining module, and a detection module.

The actual vibration curve acquiring module is configured to: acquire an actual vibration curve of a target terminal when a target game scenario is displayed; the target terminal being a device configured to display the target game scenario; the predefined vibration curve acquiring module is configured to: acquire a predefined vibration description file associated with the target game scenario, and determine a predefined vibration curve according to the predefined vibration description file; the deviation data determining module is configured to: determine target deviation data between the actual vibration curve and the predefined vibration curve; and the detection module is configured to: detect, according to the target deviation data, whether vibration of the target terminal matches the target game scenario.

According to an aspect of this application, a non-transitory computer-readable storage medium is provided, storing a computer program, the computer program, when executed by a processor of an electronic device, causing the electronic device to implement the terminal vibration evaluation method in a game scenario according to any embodiment in the first aspect described above.

According to an aspect of this application, an electronic device is provided, including: a processor; and a memory, configured to store executable instructions of the processor, the processor being configured to cause the electronic device to perform the terminal vibration evaluation method in a game scenario according to any embodiment in the first aspect described above by executing the executable instructions.

According to an aspect of this application, a computer program product or a computer program is provided, including computer instructions, the computer instructions being stored in a computer-readable storage medium. A processor of the computer device reads the computer instructions from the computer-readable storage medium and executes the computer instructions to cause the computer device to perform the terminal vibration evaluation method in a game scenario provided in the foregoing embodiments.

Exemplary embodiments of this application may have some or all of the following beneficial effects:

In the terminal vibration evaluation method in a game scenario provided in the embodiments of this application, an actual vibration curve of a target terminal (a terminal device configured to display a target game scenario) is acquired when the target game scenario is displayed, a predefined vibration description file associated with the target game scenario is acquired, and a predefined vibration curve is determined according to the predefined vibration description file. Further, target deviation data between the actual vibration curve and the predefined vibration curve is determined, and it is detected, according to the target deviation data, whether vibration of the target terminal matches the target game scenario. In this way, a standard for detecting whether terminal vibration matches a game scenario (such as a game sound or a game picture) is provided, which facilitates providing a terminal vibration form that matches the game scenario, and further helps to improve a sense of substitution in a game and a sense of immersion of a player.

It is to be understood that the foregoing general descriptions and the following detailed descriptions are merely for illustration and explanation purposes and are not intended to limit this application.

DESCRIPTION OF EMBODIMENTS

Exemplary implementations are now described more comprehensively with reference to the accompanying drawings. However, the exemplary implementations can be implemented in various forms and are not to be understood as being limited to the examples described herein. Conversely, the implementations are provided to make this application more comprehensive and complete, and comprehensively convey the idea of the examples of the implementations to a person skilled in the art. The described features, structures, or characteristics may be combined in one or more implementations in any appropriate manner. In the following description, many specific details are provided to give a full understanding of the implementations of this application. However, it is to be appreciated by a person skilled in the art that one or more of the specific details may be omitted during practice of the technical solutions of this application, or other methods, components, apparatus, steps, or the like may be used. In other cases, well-known technical solutions are not shown or described in detail to avoid overwhelming the subject and thus obscuring various aspects of this application.

In addition, the accompanying drawings are only schematic illustrations of this application and are not necessarily drawn to scale. The same reference numbers in the accompanying drawings represent the same or similar parts, and therefore, repeated descriptions thereof are omitted. Some of the block diagrams shown in the accompanying drawings are functional entities and do not necessarily correspond to physically or logically independent entities. The functional entities may be implemented in the form of software, or implemented in one or more hardware modules or integrated circuits, or implemented in different networks and/or processor apparatuses and/or micro-controller apparatuses.

Generally, vibration is invoked to alert a player when entering a game. After the game is entered, vibration can be flexibly defined according to interaction, rendering, and pace of the game to improve a sense of immersion and reality of the player. For example, for a scenario in which a character is revived or attacked by a danger, a backseat force of a shooting, a shock power of a bomb, or the like, different vibration effects can be set to stimulate a tactile sense of the player, so as to achieve an immersive effect.

Figure 1:
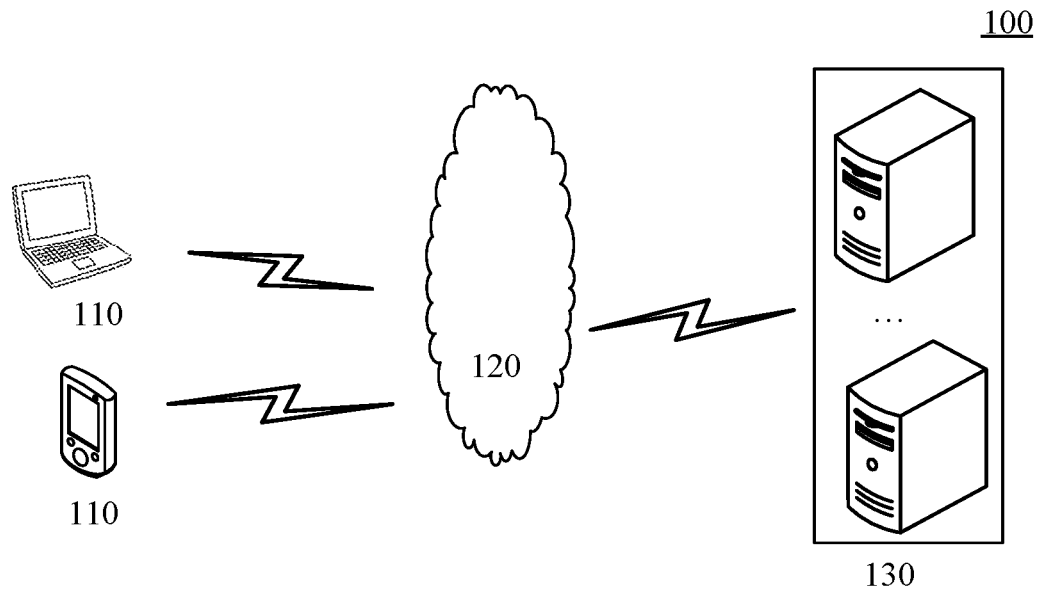
FIG. 1 is a schematic diagram of a system architecture of an exemplary application environment that can be applied to a terminal vibration solution of a game scenario according to an embodiment of this application.

FIG. 1 is a schematic diagram of a system architecture of an exemplary application environment that can be applied to a terminal vibration solution of a game scenario according to an embodiment of this application.

As shown in FIG. 1, a system architecture 100 may include a game terminal 110, a network 120, and a game server 130. The game terminal 110, the network 120, and the game server 130 are connected by using the network 120.

For example, the game terminal 110 is a terminal device that can carry game running, where the game includes a host game, an end-to-end game or a web-page game on a PC side, a mobile game running on a smartphone or a tablet computer, a cloud game running on a large screen terminal such as a television, and the like, but is not limited thereto. The network 120 may be a communications medium of various connection types that can provide a communications link between the game terminal 110 and the game server 130, for example, may be a wired communications link, a wireless communications link, or an optical fiber cable. This is not limited in this application. The game server 130 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, big data, and an artificial intelligence platform.

A terminal vibration evaluation method in a game scenario provided in an embodiment of this application may be performed by any electronic device, for example, performed by any node in the game server 130. Correspondingly, a terminal vibration detection apparatus in the game scenario may be disposed in the game server 130. In another example, the terminal vibration evaluation method in a game scenario provided in this embodiment of this application may also be performed by the terminal 110. Correspondingly, the terminal vibration detection apparatus in a game scenario may also be disposed in a corresponding terminal. This is not specifically limited in this exemplary embodiment.

For example, for a terminal game, the game server 130 delivers a vibration instruction to the game terminal 110 to generate vibration. However, in this process, many vibration impact factors (for example, a network factor and a terminal motor factor) may cause a lag before and a delay after terminal vibration. In addition, a vibration amplitude in a terminal vibration process may also be affected by a vibration impact factor, so that an actual vibration curve is deviated from a predefined vibration curve, and a vibration effect originally designed cannot be actually felt by a player.

For example, in an exemplary terminal vibration embodiment of the technical solution, the game server 130 may acquire an actual vibration curve of a target terminal when displaying a target game scenario, acquire a predefined vibration description file associated with the target game scenario, and determine a predefined vibration curve according to the predefined vibration description file. Further, target deviation data between the actual vibration curve and the predefined vibration curve is determined, and it is detected, according to the target deviation data, whether vibration of the target terminal matches the target game scenario.

In addition, in a related technology, an evaluation manner based on a vibration effect of a device mainly includes a vibration time-effectiveness evaluation method, a precision stability evaluation method, and a residual stress test method, but does not include a manner of evaluating a vibration effect in a game with reference to a game scenario (such as a sound or rendering effect). In addition, the following problems exist in a manner of evaluating a vibration effect of a terminal provided in a related technology: (1) Only a hardware capability of a terminal device is measured, for example, a smoothing degree of an amplitude curve, an impact size of a residual force after vibration, and a size of a particle size of vibration, without providing a vibration measurement solution with reference to a game scenario and player experience. (2) Different evaluation standards need to be set for different terminal devices. In addition, the vibration effect can only be debugged and corrected for manufacturers one by one, which requires a large amount of manpower and material resources. (3) Only vibration data of the terminal is evaluated, but the resulted problem is not corrected.

For one or more problems in the related technology, the technical solution provides a terminal vibration evaluation method in a game scenario, a terminal vibration detection apparatus in a game scenario, and a computer readable storage medium and an electronic device that implement the foregoing method. The following first describes in detail an embodiment of a terminal vibration evaluation method in a game scenario provided in this application.

Figure 2:
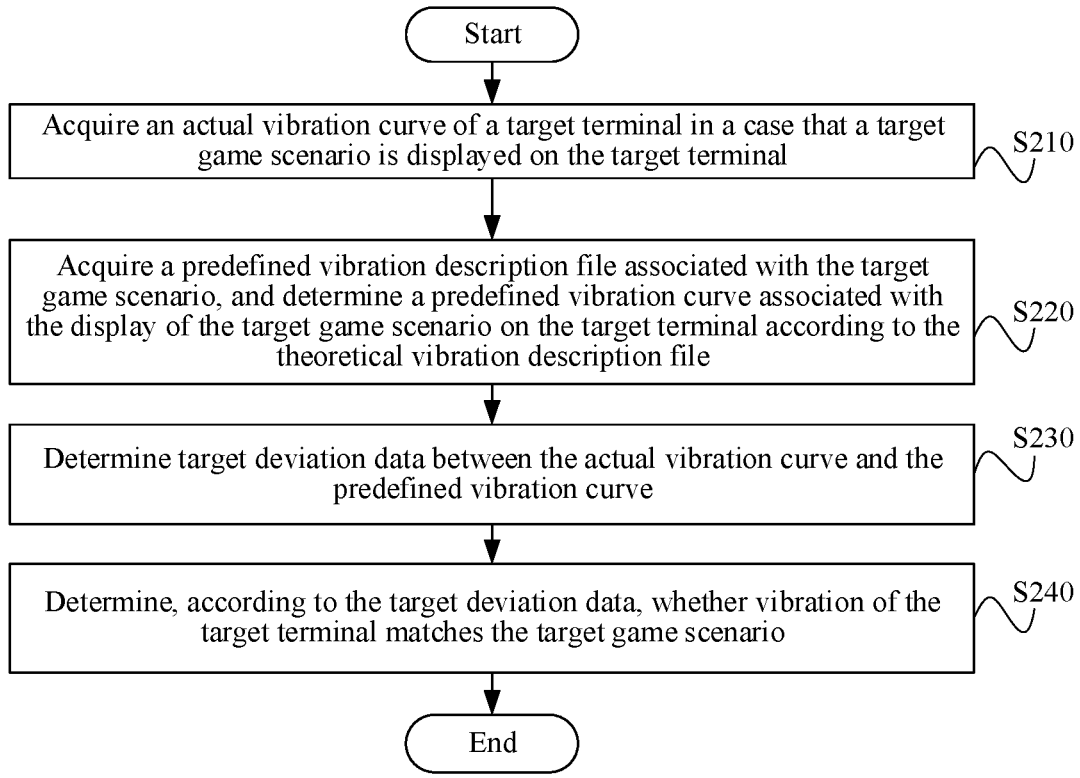
FIG. 2 is a schematic flowchart of a terminal vibration evaluation method in a game scenario according to an embodiment of this application.

FIG. 2 is a schematic flowchart of a terminal vibration evaluation method in a game scenario according to an exemplary embodiment of this application. Referring to FIG. 2, the method includes the following steps:

Step S210: Acquire an actual vibration curve of a target terminal when a target game scenario is displayed on the target terminal.

Step S220: Acquire a predefined vibration description file associated with the target game scenario, and determining a predefined vibration curve associated with the display of the target game scenario on the target terminal according to the predefined vibration description file.

Step S230: Determine target deviation data between the actual vibration curve and the predefined vibration curve.

Step S240: Determine, according to the target deviation data, whether vibration of the target terminal matches the target game scenario.

In the terminal vibration solution in the game scenario provided in the embodiment shown in FIG. 2, the deviation data between the actual vibration curve and the predefined vibration curve is determined, and whether terminal vibration matches the game scenario is detected based on the deviation data. In this way, a measurement solution used for detecting whether terminal vibration matches the game scenario (for example, a game sound and a game picture) is provided, which helps improve a matching degree between terminal vibration and the game scenario, thereby improving a sense of substitution of the game and a sense of immersion of a player.

The following describes in detail a specific implementation of each step in the embodiment shown in FIG. 2.

In an exemplary embodiment, for different types of games or different scenarios in the same type of games, vibration of a terminal may be set according to content of a current game scenario (for example, a picture or a sound), so as to enhance a sense of substitution of the game and a sense of immersion of a player. The foregoing predefined vibration description file refers to an amplitude value that changes with time. The game terminal may implement vibration of the terminal by parsing a related predefined vibration description file. For example, for a game scenario in which a character is subject to a dangerous attack, a predefined vibration description file may be developed for the scenario, and the game terminal may implement terminal vibration by parsing the file, so as to provide a player with a realistic feeling that the character is subject to a dangerous attack.

In step S210, acquire an actual vibration curve of a target terminal when a target game scenario is displayed. The target game scenario may be any game scenario of any game combined with a vibration effect. The target terminal is a terminal device that displays the target game scenario. In this embodiment, to distinguish from related terms in another game scenario, the vibration impact factor, the deviation data, and the terminal that are related to the target game scenario are separately recorded as the target vibration impact factor, the target deviation data, and the target terminal.

Further, the actual vibration curve of the target terminal when the target game scenario is displayed may be acquired in a process of displaying the target game scenario by the target terminal, vibration data generated by the target terminal is collected, and the actual vibration curve is constructed according to a generation time of the vibration data and each piece of collected vibration data. In step S220, acquire a predefined vibration description file associated with the target game scenario, and determining a predefined vibration curve associated with the display of the target game scenario on the target terminal according to the predefined vibration description file.

Further, the predefined vibration description file associated with the target game scenario (an unadjusted predefined vibration description file) is acquired, and the predefined vibration curve according to the amplitude value that is included in the predefined vibration description file and that changes with time is determined.

Figure 3:
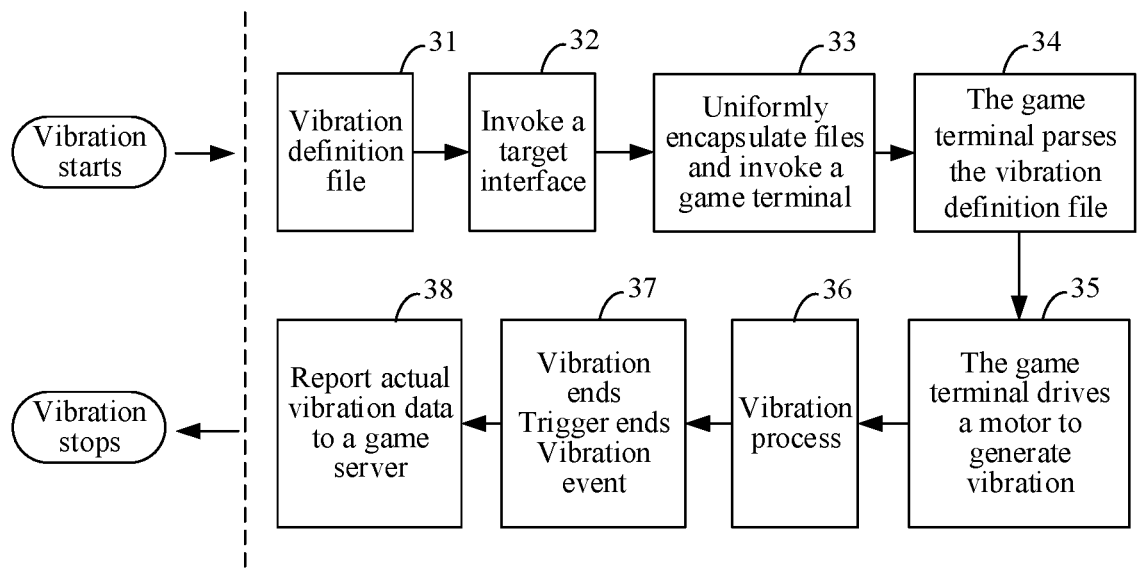
FIG. 3 is a schematic diagram of a link from vibration starting to vibration ending according to an embodiment of this application.

For example, referring to FIG. 3, FIG. 3 is a schematic diagram of a link from vibration starting to vibration ending. When vibration is started, the game terminal transmits a vibration instruction associated with a current game scenario to the game server, and the game server correspondingly determines a to-be-transmitted predefined vibration description file 31 according to the vibration instruction, invokes a target interface 32 to perform unified file encapsulation, and invokes a game terminal 33 to transmit the encapsulated predefined vibration description file to the game terminal. Further, the game terminal parses the predefined vibration description file 34 and generates vibration. Specifically, the game terminal drives a motor to generate vibration 35 to pass through a vibration process 36 (for example, cyclic vibration or vibration with different amplitudes and different frequencies in a single vibration process), vibration ending triggers ending of a vibration event 37, report actual vibration data to the game server 38, and finally vibration ends. A plurality of phases, such as time consumed for invoking an action, time consumed for encapsulating an action, time consumed for parsing a file, and delays in communication between game handles and between a game terminal and a game handle, cause a start lag of vibration. In addition, a model of the game terminal motor, an installation position of the motor at the terminal, and the like also affect an amplitude or a frequency of vibration during the vibration process 36, causing the actual vibration curve to deviate from the predefined vibration curve.

It can be learned that vibration of the game terminal has the following two problems, that is, a delay problem of vibration and a problem that the actual curve deviates from an ideal curve in the vibration process. In this technical solution, the target deviation data of the actual vibration curve relative to the foregoing predefined vibration curve is determined, so as to detect whether vibration of the terminal matches the game scenario (for example, step S230 and step S240), and provide a standard for measuring the vibration effect of the terminal with reference to the game scenario.

In an exemplary embodiment, during specific implementation of step S230 of determining the target deviation data between the actual vibration curve and the predefined vibration curve, a target fitting parameter may be determined according to the actual vibration curve and the predefined vibration curve, and further the target fitting parameter is used as the target deviation data.

Figure 7:
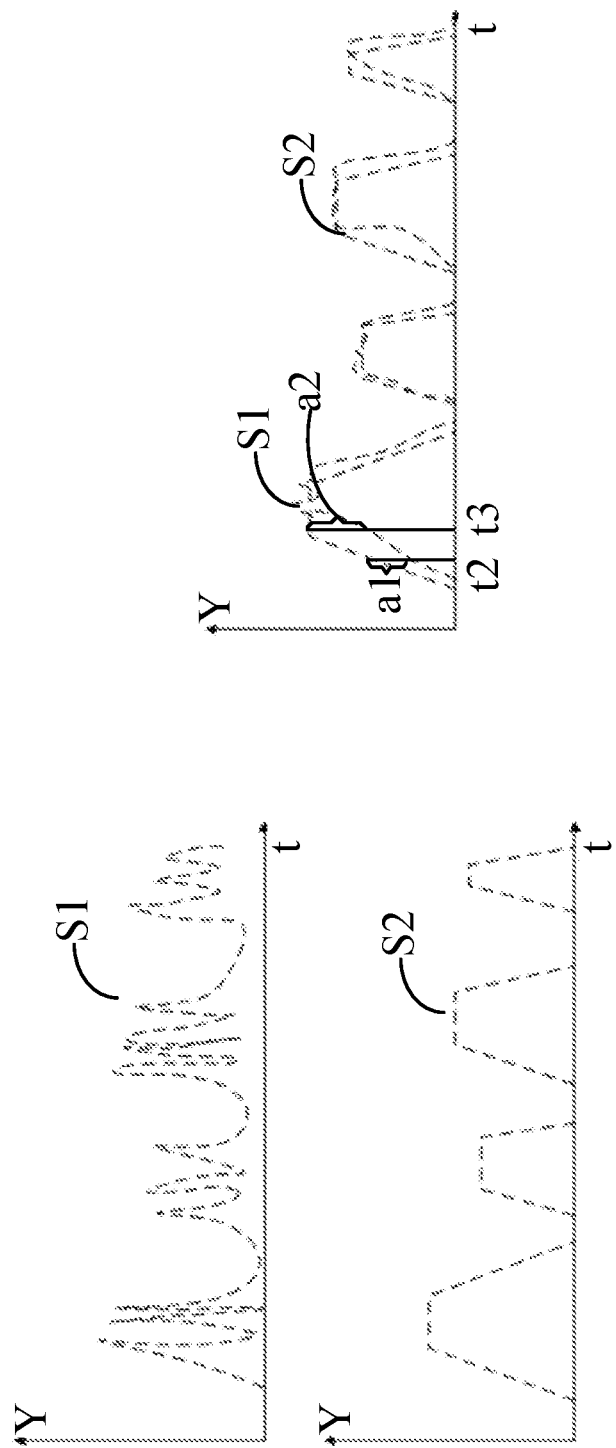
FIG. 7 is a schematic diagram of a vibration curve according to another exemplary embodiment of this application.

Specifically, FIG. 7 shows an actual vibration curve S1 generated when a game scenario is displayed, and a predefined vibration curve S2 determined according to a corresponding predefined vibration description file. According to a fitting degree of the two curves, a matching degree between an actual vibration effect and a theoretical vibration effect in a process of displaying the game scenario may be determined. Specifically, the Hausdorff algorithm may be used for calculating the fitting degree between the two.

For example, the collected vibration data may be fitted to calculate a turning point of the intensity or frequency, and then compared with the predefined vibration curve to obtain delay duration (also referred to as delay indicator generation) and trailing duration (also referred to as trailing indicator parameter) of an intensity or frequency response.

After delay duration and trailing duration of each turning point are acquired, x-axis offset and scaling may be performed on an original actual vibration curve (the original vibration data is not a fitting curve), so as to obtain an actual vibration intensity or frequency curve. In addition, the original actual vibration curve is split into a plurality of segments according to the turning point and time information of the original actual vibration curve.

Further, relative intensity or relative frequency is calculated by using the following formula:

$$X = \text{intensity/maximum intensity}$$

$$\sigma^2 = \frac{\sum(X-\mu)^2}{N}$$

where $\sigma^2$ is an overall deviation variance, and may be specifically an intensity deviation variance or a frequency deviation variance. X is the relative intensity or relative frequency of actual vibration; $\mu$ is relative vibration intensity or frequency of an original input; and N is a preset time unit, and the vibration curve is divided into N segments.

Further, the overall deviation indicator may be calculated by using the following formula:

$$F = 100 - \sqrt{\sigma^2}$$

F may be specifically an intensity overall deviation indicator (which may also be referred to as an intensity overall deviation indicator parameter) or a frequency overall deviation indicator (which may also be referred to as a frequency overall deviation indicator parameter).

When the delay indicator parameter, the trailing indicator parameter, the frequency deviation indicator parameter, and the intensity deviation indicator parameter are determined according to the actual vibration curve and the predefined vibration curve in step S230, step S240 is performed to detect, according to the target deviation data, whether vibration of the target terminal matches the target game scenario, and with reference to the vibration effect impact parameter, determine the overall evaluation indicator value according to the delay indicator parameter, the trailing indicator parameter, the frequency deviation indicator parameter, and the intensity deviation indicator parameter. Further, it is detected, according to the vibration overall evaluation indicator value, whether the vibration of the target terminal matches the target game scenario.

For example, the vibration overall evaluation indicator value $F_{score}$ may be calculated by using the following formula:

$$F_{score} = \left(1 - \frac{1}{1+e^{(a*D+b*T+c*Fhz+d*Fin)}}\right)*100$$

where a, b, c, and d are all vibration effect impact parameters, D is the delay indicator parameter, T is the trailing indicator parameter, Fhz is the frequency deviation indicator parameter, and Fin is the intensity deviation indicator parameter.

The vibration overall evaluation indicator value can reflect whether the vibration of the target terminal matches the target game scenario. For example, when the vibration overall evaluation indicator value is higher than a preset evaluation indicator threshold, it may be considered that the vibration of the target terminal matches the target game scenario; or when the vibration overall evaluation indicator value is not higher than the preset evaluation indicator threshold, it may be considered that the vibration of the target terminal does not match the target game scenario.

In an exemplary embodiment, during specific implementation of step S230 of determining the target deviation data between the actual vibration curve and the predefined vibration curve, the target deviation data between the actual vibration curve and the predefined vibration curve may be determined according to the target vibration impact factor.

Figure 4:
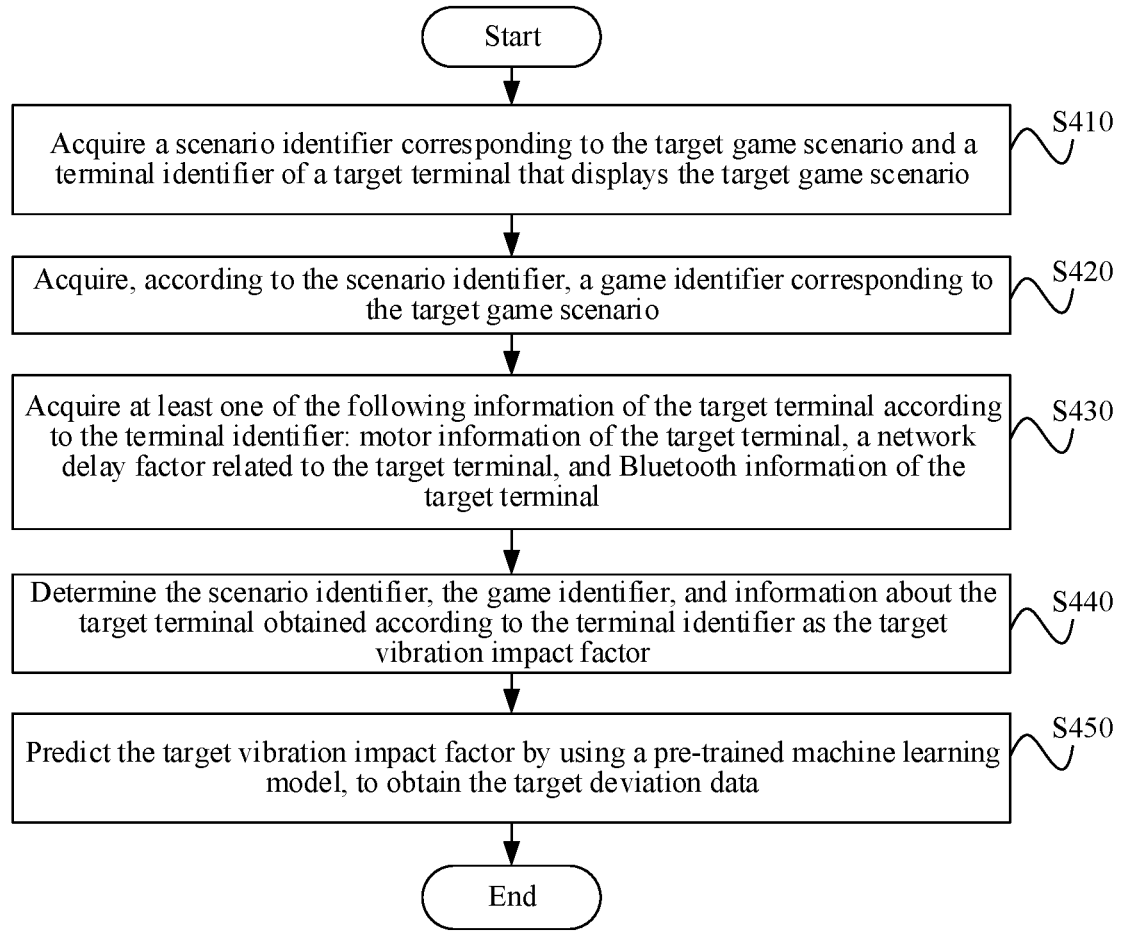
FIG. 4 is a schematic flowchart of a deviation data determining method according to an example embodiment of this application.

Referring to a flowchart of a method for determining deviation data in an exemplary embodiment of this application shown in FIG. 4, the method may be specifically used as a specific implementation of step S230. Referring to FIG. 4, the method includes the following steps:

Step S410: Acquire a scenario identifier corresponding to the target game scenario and a terminal identifier of a target terminal that displays the target game scenario. Step S420: Acquire, according to the scenario identifier, a game identifier corresponding to the target game scenario. Step S430: Acquire at least one of the following information of the target terminal according to the terminal identifier: motor information of the target terminal, a network delay factor related to the target terminal, and Bluetooth information of the target terminal. Step S440: Determine the scenario identifier, the game identifier, and information about the target terminal obtained according to the terminal identifier as the target vibration impact factor.

For example, the foregoing target game scenario may be a "yy scenario" in an "xx game", where a scenario identifier is "yy" and a game identifier is "xx", and different scenarios in different games or the same game may be corresponding to different types of vibration. Therefore, the vibration impact factor includes a scenario identifier and a game identifier. In addition, related information of the terminal may also affect a vibration effect of the terminal. Therefore, physical information of the terminal, such as quality of the terminal, a shape of the terminal, and a material used by the terminal, may be further acquired according to an identifier (for example, a terminal model) of a terminal currently running the game. Motor information of the terminal of this model may be further acquired, for example, information that affects vibration of the terminal, such as a motor type, a motor manufacturer, and a motor installation location of the terminal. In addition, a network delay factor and Bluetooth information related to the target terminal may be further acquired. The foregoing information may affect a start time of vibration, so that the actual vibration curve of the terminal deviates from the predefined vibration curve, and therefore may be used as a vibration impact factor. Therefore, a vibration impact factor (denoted as "target vibration impact factor") of the target game scenario is acquired.

Figure 5:
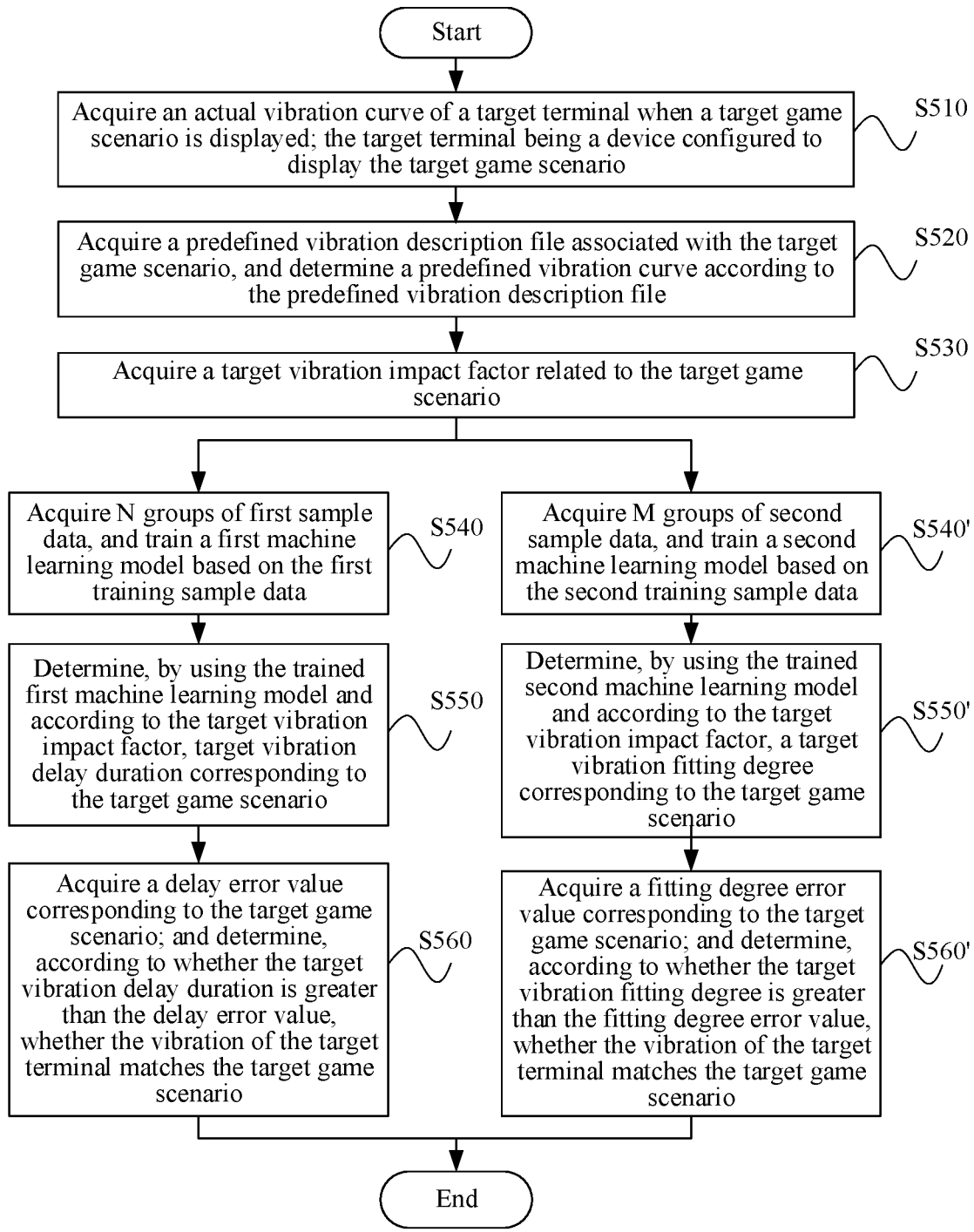
FIG. 5 is a schematic flowchart of a terminal vibration evaluation method in a game scenario according to another embodiment of this application.

Further, in step S450, the target vibration impact factor is predicted by using a pre-trained machine learning model, to obtain the target deviation data (a specific embodiment is described in detail in the embodiment corresponding to FIG. 5). In this technical solution, an artificial intelligence technology is used for acquiring deviation data of the foregoing game scenario, so as to further provide a self-correction solution for terminal vibration.

In an exemplary embodiment, FIG. 5 is a schematic flowchart of a terminal vibration evaluation method in a game scenario according to another exemplary embodiment of this application. Specifically, with reference to FIG. 5, the following two aspects related to vibration of a game terminal are described, which specifically include: Step S540 to step S560: Detect, according to a delay of vibration, whether terminal vibration matches a game scenario; and step S540' to step S560': Detect, according to a case in which an actual vibration curve deviates from an ideal vibration curve during a vibration process, whether terminal vibration matches a game scenario.

Specific implementations of step S510 and step S520 are respectively the same as those of step S210 and step S220, and are not described herein again.

After the foregoing target impact factor is acquired by using step S530, specific implementations of step S540 to S560 are first described.

In step S540, acquire N groups of first sample data, and train a first machine learning model based on the first training sample data.

An ith group of first sample data includes: a scenario identifier corresponding to an ith game scenario, an identifier of a terminal used for displaying the ith game scenario, and vibration delay duration caused when the terminal displays the ith game scenario, where N is a positive integer, and i is a positive integer not greater than N. That is, each group of first sample data includes a group of vibration impact factors and delay duration of vibration starting under impact of the group of vibration impact factors.

Figure 6:
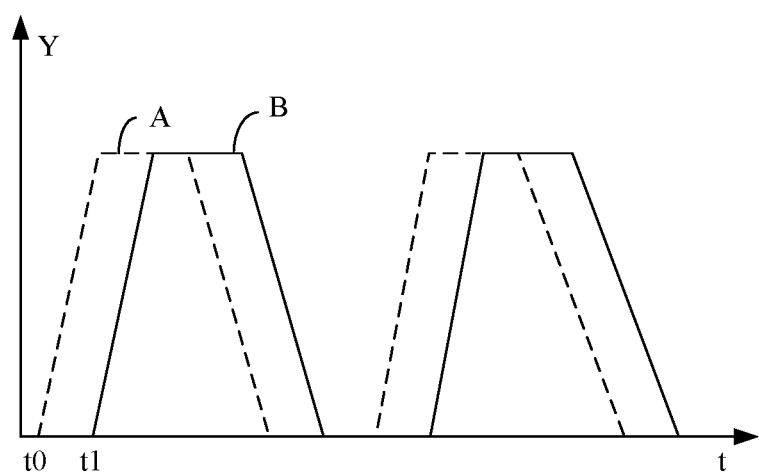
FIG. 6 is a schematic diagram of a vibration curve according to an exemplary embodiment of this application.

In an exemplary embodiment, a manner for determining vibration delay duration in each group of first sample data is as follows:

Referring to FIG. 6, a vibration curve of amplitude Y varying with time t is shown. For the ith group of first sample data, an unadjusted predefined vibration description file associated with the ith game scenario is acquired, and a predefined vibration curve of the ith game scenario is determined according to the unadjusted predefined vibration description file (a vibration curve A shown by a dashed line in FIG. 6). Further, an actual vibration curve (a vibration curve B shown by a solid line in FIG. 6) of the terminal is acquired when the ith game scenario is displayed, where the actual vibration curve is generated by the terminal according to the unadjusted predefined vibration description file when a vibration impact factor exists. Further, by comparing the predefined vibration curve with the actual vibration curve (for example, comparing a difference between a start time $t1$ of the vibration curve B and a start time $t0$ of the vibration curve A), vibration delay duration (for example, duration shown in $t0$ to $t1$ in FIG. 6) caused when the terminal displays the ith game scenario is obtained.

In an exemplary embodiment, the first machine learning model is trained and tested by using the foregoing first sample data, so that the trained first machine learning model meets a preset model evaluation indicator. For example, a model evaluation indicator such as AUC, F1 score, and model enhancement may be used for evaluating a model prediction capability.

Referring to FIG. 5, in step S550, determine, by using the trained first machine learning model and according to the target vibration impact factor, target vibration delay duration corresponding to the target game scenario.

In step S560, acquire a delay error value corresponding to the target game scenario; and determine, according to whether the target vibration delay duration is greater than the delay error value, whether the vibration of the target terminal matches the target game scenario.

For example, the delay error value may be related to the game scenario, and may be determined according to an actual requirement, which is not limited in this technical solution.

For example, when the target vibration delay duration is greater than the delay error value, it indicates that the current vibration delay duration is not in an error range, and has impact on a sense of immersion of a player. Therefore, a detection result is that the vibration of the target terminal does not match the target game scenario. When the target vibration delay duration is not greater than the delay error value, it indicates that the current vibration delay duration is within the error range, and does not affect the sense of immersion of the player, and a detection result is that the vibration of the target terminal matches the target game scenario.

In an exemplary embodiment, for a game scenario that requires a relatively complex vibration effect, for example, a game scenario that includes start vibration, cyclic vibration, high-low amplitude vibration, and the like, in this technical solution, a fitting degree between a predefined vibration curve and an actual vibration curve is used as a standard for measuring a vibration effect of a terminal. Referring to FIG. 7, a vibration curve of an amplitude Y varying with time t is shown, where a vibration curve S1 is an actual vibration curve, and a vibration curve S2 is a predefined vibration curve. A fitting degree between the predefined vibration curve S2 shown in FIG. 7 and the actual vibration curve S1 actually generated by the terminal device may be used for calculating the matching degree between the actual vibration effect and the ideal vibration effect in the entire interaction process. For example, the fitting degree may be calculated by using the Hausdorff algorithm. A specific solution is as follows:

In step S540', acquire M groups of second sample data, and train a second machine learning model based on the second training sample data.

A jth group of second sample data includes: a scenario identifier corresponding to the jth game scenario, an identifier of a terminal used for displaying the jth game scenario, and a vibration fitting degree caused when the terminal displays the jth game scenario, where M is a positive integer, and j is a positive integer not greater than M. That is, each group of second sample data includes a group of vibration impact factors and a fitting degree between an actual vibration curve and a predefined vibration curve under impact of the group of vibration impact factors.

In an exemplary embodiment, a manner of determining a vibration fitting degree in each group of second sample data is as follows:

For the jth group of second sample data, acquire an unadjusted predefined vibration description file associated with the jth game scenario, and determine a predefined vibration curve (a vibration curve S2 shown in FIG. 7) of the jth game scenario according to the unadjusted predefined vibration description file, and acquire an actual vibration curve (a vibration curve S1 shown in FIG. 7) of the terminal when the jth game scenario is displayed, where the actual vibration curve is generated by the terminal according to the unadjusted predefined vibration description file when a vibration impact factor exists. Further, by comparing the predefined vibration curve S2 with the actual vibration curve S1 (a curve comparison diagram shown on the right side of FIG. 7), an amplitude deviation sequence (the sequence includes amplitude deviation a1 corresponding to t2 time point and amplitude deviation a2 corresponding to t3 time point in FIG. 7) when the terminal displays the jth game scenario is obtained, and a vibration fitting degree according to the amplitude deviation sequence is calculated.

In an exemplary embodiment, the second machine learning model is trained and tested by using the foregoing second sample data, so that the trained second machine learning model meets a preset model evaluation indicator. For example, a model evaluation indicator such as AUC, F1 score, and model enhancement may be used for evaluating a model prediction capability.

Referring to FIG. 5 again, in step S550', determine, by using the trained second machine learning model and according to the target vibration impact factor, a target vibration fitting degree corresponding to the target game scenario.

In step S560', acquire a fitting degree error value corresponding to the target game scenario; and determine, according to whether the target vibration fitting degree is greater than the fitting degree error value, whether the vibration of the target terminal matches the target game scenario.

For example, the fitting degree error value may be related to the game scenario, and may be determined according to an actual requirement, which is not limited in this technical solution.

For example, when the target vibration fitting degree is greater than the fitting degree error value, it indicates that the current vibration fitting degree is not within an error range, and has impact on a sense of immersion of a player. Therefore, a detection result is that the vibration of the target terminal does not match the target game scenario. When the target vibration fitting degree is not greater than the fitting degree error value, it indicates that the current vibration fitting degree is within the error range, and does not affect the sense of immersion of the player, and a detection result is that the vibration of the target terminal matches the target game scenario.

Figure 8:
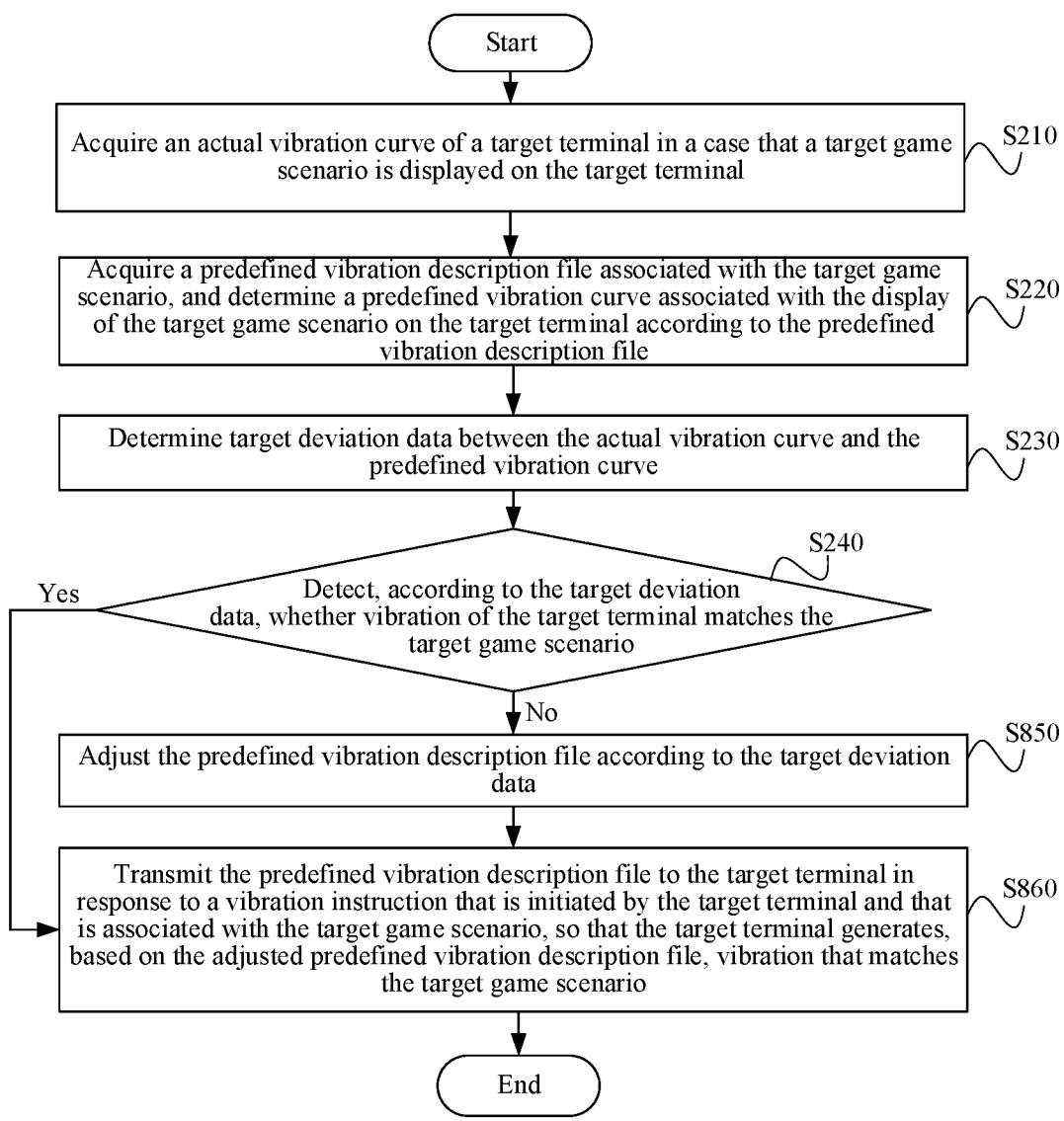
FIG. 8 is a schematic flowchart of a terminal vibration evaluation method in a game scenario according to still another embodiment of this application.

In an exemplary embodiment, FIG. 8 is a schematic flowchart of a terminal vibration evaluation method in a game scenario according to still another exemplary embodiment of this application. The embodiment shown in FIG. 8 is performed on the basis of FIG. 2.

Specifically, when the detection result obtained in step S240 is that the vibration of the target terminal does not match the target game scenario, step S850 is performed: adjust the predefined vibration description file according to the target deviation data to obtain an adjusted predefined vibration description file. Because deviation data in the adjusted predefined vibration description file is offset, vibration generated based on the adjusted predefined vibration description file can make the vibration of the terminal match the target game scenario (such as a sound or a picture), thereby improving a sense of substitution of the game and a sense of immersion of the player. That is, the technical solution provides a solution for detecting terminal vibration in the game scenario; and for a scenario in which vibration does not match the game scenario, a self-correction solution is further provided.

For example, a specific implementation of step S850 is as follows: determine a deviation cancellation factor according to the target deviation data; and perform adjustment processing on the predefined vibration description file based on the deviation cancellation factor, to obtain the adjusted predefined vibration description file.

The deviation cancellation factor may be obtained by multiplying the obtained target deviation data by a preset coefficient according to an actual requirement. Further, the original predefined vibration description file is adjusted based on the deviation cancellation factor, to obtain the adjusted predefined vibration description file.

For example, when the target deviation data is the target vibration delay duration, a specific implementation of step S840 is as follows: determine a first deviation cancellation factor according to the target vibration delay duration; and advance each time point in the predefined vibration description file by duration corresponding to the first deviation cancellation factor, to obtain the adjusted predefined vibration description file.

As described above, according to an actual requirement, the first deviation cancellation factor is obtained by multiplying the obtained target vibration delay duration by a preset coefficient, and certainly, the preset coefficient may be 1. Further, each time point in the predefined vibration description file is advanced by duration corresponding to the first deviation cancellation factor, to obtain the adjusted predefined vibration description file. For example, referring to FIG. 6, if the duration corresponding to the first deviation cancellation factor is duration shown in t0 to t1, after the foregoing adjustment is performed on the original predefined vibration description file, a start time of the actual vibration curve (the vibration curve B shown by a solid line in FIG. 6) may be theoretically the same as a start time of the predefined vibration curve (the vibration curve A shown by a dashed line in FIG. 6), thereby eliminating a delay/lag problem of terminal vibration starting.

For example, when the target deviation data is the target vibration fitting degree, a specific implementation of step S850 is as follows: determine a second deviation cancellation factor according to the target vibration fitting degree; and process, according to the second deviation cancellation factor, an amplitude value corresponding to each time point in the predefined vibration description file, to obtain the adjusted predefined vibration description file.

As described above, the second deviation cancellation factor may be obtained by multiplying the obtained vibration fitting degree by a preset coefficient according to an actual requirement, and certainly, the preset coefficient may be 1. Further, the amplitude value of the corresponding time point in the original predefined vibration description file is processed according to the target vibration fitting degree of each time point, to obtain the adjusted predefined vibration description file.

For example, referring to FIG. 7, after the second deviation cancellation factor is used for adjusting the original predefined vibration description file, a fitting degree between the actual vibration curve (the vibration curve S1 shown in FIG. 7) and the predefined vibration curve (the vibration curve S2 shown in FIG. 7) may be 1 theoretically, thereby eliminating a problem that the actual curve deviates from the theoretical curve in the vibration process of the terminal.

Referring to FIG. 8 again, when the detection result obtained in step S240 is that the vibration of the target terminal matches the target game scenario (this case indicates that there is no deviation in the current theoretical vibration positioning file), or after the predefined vibration description file is adjusted according to the target deviation data shown in step S850 (in this case, the deviation in the adjusted vibration positioning file is offset), step S860 is performed: transmit the predefined vibration description file to the target terminal in response to a vibration instruction that is initiated by the target terminal and that is associated with the target game scenario, so that the target terminal generates, based on the adjusted predefined vibration description file, vibration that matches the target game scenario.

Because deviation data in the predefined vibration description file in step S860 is offset, based on the adjusted predefined vibration description file, a problem that a delay/lag exists in vibration starting of the terminal and the actual vibration curve in the vibration process deviate from the predefined vibration curve can be effectively avoided, so that vibration of the terminal can match the target game scenario (such as a sound or a picture), thereby improving a sense of immersion of the player.

For example, in a specific implementation of step S850, invoke a target interface in response to vibration instructions that are initiated by a plurality of target terminals and that are associated with the target game scenario, so as to perform format protocol conversion on the predefined vibration description file by using the target interface, to obtain a unified-format predefined vibration description file; and transmit the unified-format predefined vibration description file to the plurality of target terminals, so that after parsing the adjusted predefined vibration description file, the target terminals generate vibration that matches the target game scenario.

For example, the target interface can shield a difference between different game terminal manufacturers and a difference between different game platforms, and is essentially an interface that meets a unified protocol (for example, a tgpa that encapsulates a vibration invoking interface of each terminal manufacturer). Therefore, a development process of the game vibration description file only pays attention to a vibration effect in a scenario, and invokes the foregoing target interface to deliver a predefined vibration description file of a uniform format to the terminal, so that a vibration effect is generated at a bottom layer of the terminal without paying attention to differences between different game platforms or terminal manufacturers. That is, there is no need to set different evaluation standards for different device terminals, and therefore, the vibration effect does not need to be debugged and corrected for manufacturers one by one, finally saving manpower and material resources.

Figure 9:
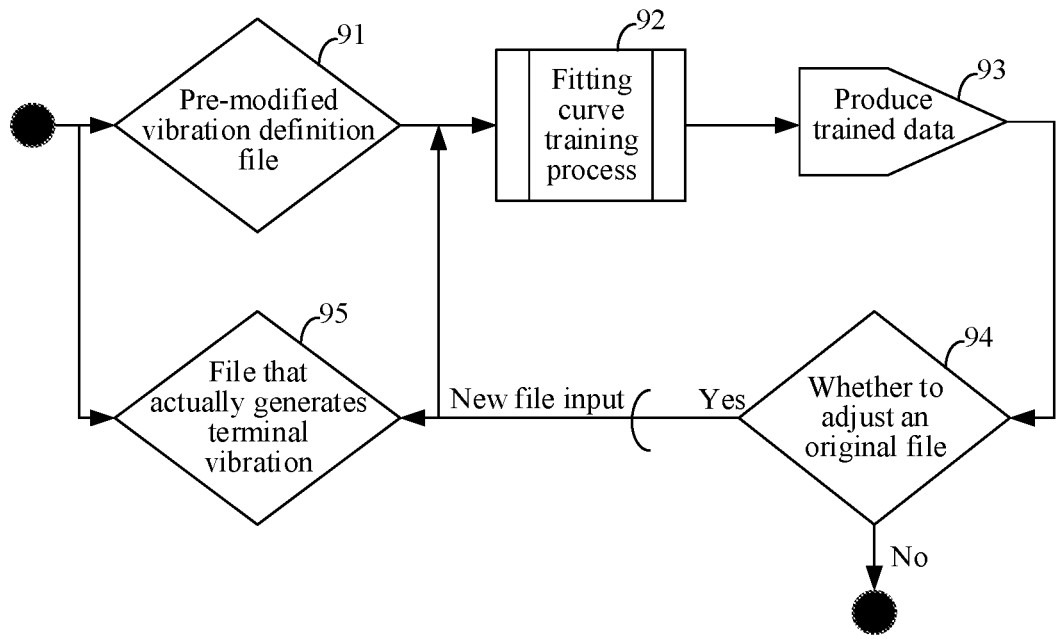
FIG. 9 is a schematic flowchart of a terminal vibration evaluation method in a game scenario according to yet another embodiment of this application.

In this technical solution, based on the foregoing target interface as a unified invoking interface of each game terminal, a vibration impact factor and vibration delay duration/vibration fitting degree in a game scenario may be uniformly reported to a cloud by using the interface. For the foregoing plurality of granularities, massive data learning and training (for example, a fitting curve training process 92 in FIG. 9) are performed on a vibration effect diagram in terms of vibration lag time and scenario, an uncertain factor may be trained as a quantifiable vibration factor offset by using regularity of big data, and then used in practice to perform interference factor cancellation processing. Training a machine learning model generates trained data 93, to further determine whether an original file 94 needs to be adjusted (that is, an unadjusted predefined vibration description file 91). If the original file 94 does not need to be adjusted, terminal vibration may be implemented by using the original file. If the original file 94 needs to be adjusted, terminal vibration is performed by using the adjusted predefined vibration description file (a file 95 in FIG. 9 in which terminal vibration is actually generated), and the foregoing adjustment amount is used together with the unadjusted predefined vibration description file for model training. Thus, closing of the entire iteration optimization is performed. In addition, the whole process does not require any human intervention, and self-learning, optimization, and iteration are performed by using massive cloud data.

A person skilled in the art may understand that all or some of the steps of the foregoing implementations are implemented as computer programs executed by a processor (including a CPU and a GPU). When the computer programs are executed by the processor, the foregoing functions defined by the foregoing methods provided in this application are implemented. The programs may be stored in a computer-readable storage medium. The storage medium may be a read-only memory, a magnetic disk, an optical disc, or the like.

In addition, the foregoing accompanying drawings are merely schematic descriptions of processing included in the methods of exemplary implementations in this application, and are not used for a limitative purpose. It is easily understood that the processes illustrated in the foregoing accompanying drawings do not indicate or define the chronological order of these processes. In addition, it is also easily understood that these processes may be performed, for example, synchronously or asynchronously in a plurality of modules.

The following describes a terminal vibration detection apparatus in a game scenario provided in the technical solution.

Figure 10:
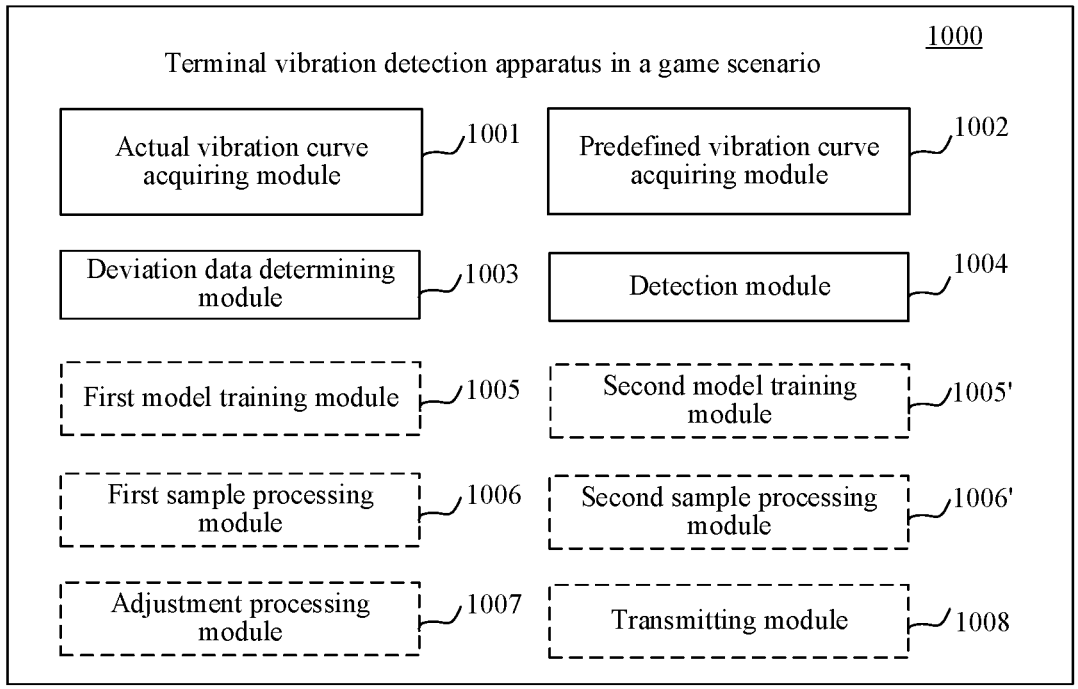
FIG. 10 is a schematic structural diagram of a terminal vibration detection apparatus in a game scenario that can be applied to another embodiment of this application.

An example implementation provides a terminal vibration detection apparatus in a game scenario. Referring to FIG. 10, a terminal vibration detection apparatus 1000 in a game scenario includes: an actual vibration curve acquiring module 1001, a predefined vibration curve acquiring module 1002, a deviation data determining module 1003, and a detection module 1004.

The actual vibration curve acquiring module 1001 is configured to: acquire an actual vibration curve of a target terminal when a target game scenario is displayed; the target terminal being a device configured to display the target game scenario; the predefined vibration curve acquiring module 1002 is configured to: acquire a predefined vibration description file associated with the target game scenario, and determine a predefined vibration curve according to the predefined vibration description file; the deviation data determining module 1003 is configured to: determine target deviation data between the actual vibration curve and the predefined vibration curve; and the detection module 1004 is configured to: detect, according to the target deviation data, whether vibration of the target terminal matches the target game scenario.

In an exemplary embodiment, based on the foregoing solution, the deviation data determining module 1003 is specifically configured to: determine a target fitting parameter according to the actual vibration curve and the predefined vibration curve, and use the target fitting parameter as the target deviation data.

In an exemplary embodiment, based on the foregoing solution, the deviation data determining module 1003 is specifically configured to: determine a delay indicator parameter, a trailing indicator parameter, a frequency deviation indicator parameter, and an intensity deviation indicator parameter according to the actual vibration curve and the predefined vibration curve; and the detection module 1004 is specifically configured to: determine, with reference to a vibration effect impact parameter, a vibration overall evaluation indicator value according to the delay indicator parameter, the trailing indicator parameter, the frequency deviation indicator parameter, and the intensity deviation indicator parameter; and detect, according to the vibration overall evaluation indicator value, whether the vibration of the target terminal matches the target game scenario.

In an exemplary embodiment, based on the foregoing solution, the deviation data determining module 1003 is specifically configured to: determine the target deviation data between the actual vibration curve and the predefined vibration curve according to a target vibration impact factor.

In an exemplary embodiment, based on the foregoing solution, the deviation data determining module 1003 is specifically configured to: acquire a scenario identifier corresponding to the target game scenario and a terminal identifier of the target terminal; acquire, according to the scenario identifier, a game identifier corresponding to the target game scenario; acquire at least one of the following information of the target terminal according to the terminal identifier: motor information of the target terminal, a network delay factor related to the target terminal, and Bluetooth information of the target terminal. determine the scenario identifier, the game identifier, and information about the target terminal obtained according to the terminal identifier as the target vibration impact factor.

In an exemplary embodiment, based on the foregoing solution, the target deviation data includes target vibration delay duration; and the apparatus further includes a first model training module 1005.

The first model training module 1005 is configured to: acquire N groups of first sample data, an ith group of first sample data including: a scenario identifier corresponding to an ith game scenario, an identifier of a terminal used for displaying the ith game scenario, and vibration delay duration caused when the terminal displays the ith game scenario, where N is a positive integer, and i is a positive integer not greater than N; train a first machine learning model based on the N groups of first sample data, so that a trained first machine learning model meets a preset model evaluation indicator, and the trained first machine learning model is used for determining the target vibration delay duration.

In an exemplary embodiment, based on the foregoing solution, the apparatus further includes a first sample processing module 1006.

The first sample processing module 1006 is configured to: acquire an unadjusted predefined vibration description file associated with the ith game scenario for the ith group of first sample data; determine a predefined vibration curve of the ith game scenario according to the unadjusted predefined vibration description file; acquire an actual vibration curve of the terminal in a case of displaying the ith game scenario, the actual vibration curve being generated by the terminal according to the unadjusted predefined vibration description file in the presence of a vibration impact factor; and compare the predefined vibration curve with the actual vibration curve to obtain the vibration delay duration caused when the terminal displays the ith game scenario.

In an exemplary embodiment, based on the foregoing solution, the deviation data determining module 1003 is further specifically configured to: determine, by using the trained first machine learning model and according to the target vibration impact factor, target vibration delay duration corresponding to the target game scenario.

In an exemplary embodiment, based on the foregoing solution, the detection module 1004 is specifically configured to: acquire a delay error value corresponding to the target game scenario; and determine, when the target vibration delay duration is greater than the delay error value, that a detection result is that the vibration of the target terminal does not match the target game scenario.

In an exemplary embodiment, based on the foregoing solution, the target deviation data includes a target vibration fitting degree; and the apparatus further includes a second model training module 1005'.

The second model training module 1005' is configured to: acquire M groups of second sample data, a jth group of second sample data including: a scenario identifier corresponding to the jth game scenario, an identifier of a terminal used for displaying the jth game scenario, and a vibration fitting degree caused when the terminal displays the jth game scenario; and M being a positive integer, and j being a positive integer not greater than M; and train a second machine learning model based on the M groups of second sample data, so that a trained second machine learning model meets a preset model evaluation indicator, and the trained second machine learning model is used for determining the target vibration fitting degree.

In an exemplary embodiment, based on the foregoing solution, the apparatus further includes: a second sample processing module 1006'.

The second sample processing module 1006' is configured to: acquire an unadjusted predefined vibration description file associated with the jth game scenario for the jth group of second sample data; determine a predefined vibration curve of the jth game scenario according to the unadjusted predefined vibration description file; acquire an actual vibration curve of the terminal in a case of displaying the jth game scenario, the actual vibration curve being generated by the terminal according to the unadjusted predefined vibration description file in the presence of a vibration impact factor; and compare the predefined vibration curve with the actual vibration curve to obtain an amplitude deviation sequence caused when the terminal displays the jth game scenario, and calculating the vibration fitting degree according to the amplitude deviation sequence.

In an exemplary embodiment, based on the foregoing solution, the deviation data determining module 1002 is further specifically configured to: determine, by using the trained second machine learning model and according to the target vibration impact factor, a target vibration fitting degree corresponding to the target game scenario.

In an exemplary embodiment, based on the foregoing solution, the detection module 1004 is specifically configured to: acquire a fitting degree error value corresponding to the target game scenario; and determine, when the target vibration fitting degree is greater than the fitting degree error value, that a detection result is that the vibration of the target terminal does not match the target game scenario.

In an exemplary embodiment, based on the foregoing solution, the apparatus further includes: an adjustment processing module 1007 and a transmitting module 1008.

The adjustment processing module 1007 is configured to: adjust the predefined vibration description file according to the target deviation data to obtain an adjusted predefined vibration description file; and the transmitting module 1008 is configured to: transmit the adjusted predefined vibration description file to the target terminal in response to a vibration instruction that is initiated by the target terminal and that is associated with the target game scenario, so that the target terminal generates, based on the adjusted predefined vibration description file, vibration that matches the target game scenario.

In an exemplary embodiment, based on the foregoing solution, the adjustment processing module 1007 is specifically configured to: determine a deviation cancellation factor according to the target deviation data; and perform adjustment processing on the predefined vibration description file based on the deviation cancellation factor, to obtain the adjusted predefined vibration description file.

In an exemplary embodiment, based on the foregoing solution, the target deviation data includes target vibration delay duration; and the adjustment processing module 1007 is further specifically configured to: determine a first deviation cancellation factor according to the target vibration delay duration; and advance each time point in the predefined vibration description file by duration corresponding to the first deviation cancellation factor, to obtain the adjusted predefined vibration description file.

In an exemplary embodiment, based on the foregoing solution, the target deviation data includes a target vibration fitting degree; and the adjustment processing module 1007 is further specifically configured to: determine a second deviation cancellation factor according to the target vibration fitting degree; and process, according to the second deviation cancellation factor, an amplitude value corresponding to each time point in the predefined vibration description file, to obtain the adjusted predefined vibration description file.

In an exemplary embodiment, based on the foregoing solution, the transmitting module 1008 is specifically configured to: invoke a target interface in response to vibration instructions that are initiated by a plurality of target terminals and that are associated with the target game scenario, so as to perform format protocol conversion on the adjusted predefined vibration description file by using the target interface, to obtain a unified-format predefined vibration description file; and transmit the unified-format predefined vibration description file to the plurality of target terminals, so that after parsing the adjusted predefined vibration description file, the target terminals generate vibration that matches the target game scenario.

Specific details of the modules or units in the terminal vibration detection apparatus in a game scenario are already described in detail in the corresponding terminal vibration evaluation method in a game scenario. Therefore, details are not described herein again.

Figure 11:
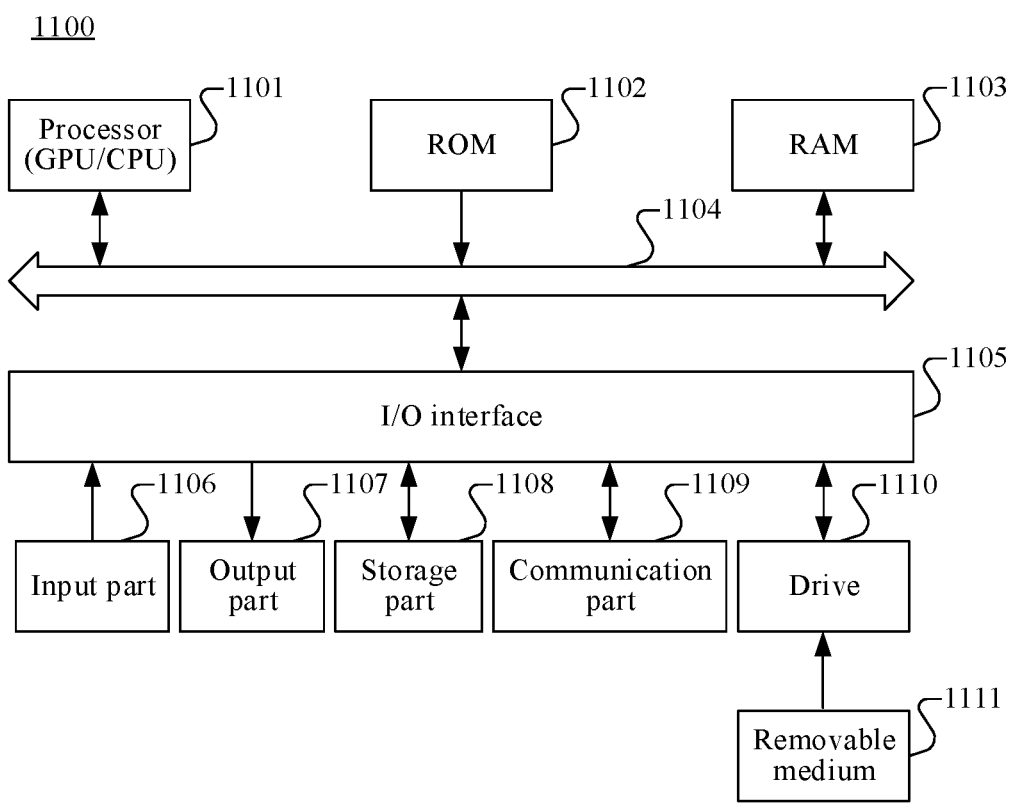
FIG. 11 is a schematic structural diagram of a computer system adapted to implement an electronic device according to an embodiment of this application.

FIG. 11 is a schematic structural diagram of a computer system adapted to implement an electronic device according to an embodiment of the present disclosure.

The computer system 1100 of the electronic device shown in FIG. 11 is merely an example, and does not constitute any limitation on functions and use ranges of the embodiments of this application.

As shown in FIG. 11, the computer system 1100 includes a processor 1101, where the processor 1101 may include: A graphic processing unit (GPU) and a central processing unit (CPU) may perform various appropriate actions and processing according to a program stored in a read-only memory (ROM) 1102 or a program loaded from a storage part 1108 into a random access memory (RAM) 1103. The RAM 1103 further stores various programs and data required for operating the system. The processor (GPU/CPU) 1101, the ROM 1102, and the RAM 1103 are connected to each other through a bus 1104. An input/output (I/O) interface 1105 is also connected to the bus 1104.

The following components are connected to the I/O interface 1105: an input part 1106 including a keyboard and a mouse, etc.; an output part 1107 including a cathode ray tube (CRT), a liquid crystal display (LCD), a speaker, or the like; a storage part 1108 including hard disk, or the like; and a communication part 1109 including a network interface card such as a local area network (LAN) card, a modem, or the like. The communication part 1109 performs communication processing by using a network such as the Internet. A drive 1110 is also connected to the I/O interface 1105 as required. A removable medium 1111, such as a disk, an optical disc, a magneto-optical disc, or a semiconductor memory, is installed on the drive 1110 as required, so that a computer program read from the removable medium 1111 is installed in the storage part 1108 as required.

Particularly, according to the embodiments of this application, the processes described in the following by referring to the flowcharts may be implemented as computer software programs. For example, the embodiments of this application include a computer program product, the computer program product includes a computer program carried on a computer-readable medium, and the computer program includes program code used for performing the methods shown in the flowcharts. In such an embodiment, the computer program may be downloaded and installed from a network through the communication part 1109, and/or installed from the removable medium 1111. When the computer program is executed by the processor (GPU/CPU) 1101, the various functions defined in the system of this application are executed. In some embodiments, the computer system 1100 may further include an AI processor. The AI processor is configured to process computing operations related to machine learning.

The computer-readable medium shown in the embodiments of this application may be a computer-readable signal medium or a computer-readable storage medium or any combination of two. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In this application, the computer-readable storage medium may be any tangible medium containing or storing a program, and the program may be used by or used in combination with an instruction execution system, an apparatus, or a device. In this application, a computer-readable signal medium may include a data signal being in a baseband or propagated as a part of a carrier wave, the data signal carrying computer-readable program code. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The program code included in the computer-readable medium may be transmitted using any suitable medium, including but not limited to: a wireless medium, a wired medium, or the like, or any suitable combination thereof.

The flowcharts and block diagrams in the accompanying drawings illustrate possible system architectures, functions, and operations that may be implemented by a system, a method, and a computer program product according to various embodiments of this application. In this regard, each box in the flowchart or the block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of this application may be implemented in a software manner, or may be implemented in a hardware manner, and the unit described may also be set in a processor. Names of the units do not constitute a limitation on the units in a specific case.

In another aspect, this application further provides a computer readable medium. The computer readable medium may be included in the electronic device described in the above embodiments, or may exist alone without being assembled into the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of this application, the features and functions of two or more modules or units described above may be specified in one module or unit. Conversely, features and functions of one module or unit described above may be further divided into a plurality of modules or units for implementation.

It is to be understood that this application is not limited to the precise structures described above and shown in the accompanying drawings, and various modifications and changes can be made without departing from the scope of this application. The scope of this application is limited by the appended claims only. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A terminal vibration evaluation method in a game scenario, performed by an electronic device and comprising:
   acquiring an actual vibration curve of a target terminal when a target game scenario is displayed on the target terminal;
   acquiring a predefined vibration description file associated with the target game scenario, and determining a predefined vibration curve associated with the display of the target game scenario on the target terminal according to the predefined vibration description file;
   determining target deviation data between the actual vibration curve and the predefined vibration curve according to a target vibration impact factor associated with the target terminal and the target game scenario; and
   determining, according to the target deviation data, whether vibration of the target terminal matches the target game scenario.

2. The method according to claim 1, wherein the determining target deviation data between the actual vibration curve and the predefined vibration curve comprises:
   determining a target fitting parameter according to the actual vibration curve and the predefined vibration curve, and using the target fitting parameter as the target deviation data.

3. The method according to claim 2, wherein the determining a target fitting parameter according to the actual vibration curve and the predefined vibration curve comprises:
   determining one or more of a delay indicator parameter, a trailing indicator parameter, a frequency deviation indicator parameter, and an intensity deviation indicator parameter according to the actual vibration curve and the predefined vibration curve; and
   the determining, according to the target deviation data, whether vibration of the target terminal matches the target game scenario comprises:
   determining a vibration overall evaluation indicator value according to one or more of the delay indicator parameter, the trailing indicator parameter, the frequency deviation indicator parameter, and the intensity deviation indicator parameter; and determining, according to the vibration overall evaluation indicator value, whether the vibration of the target terminal matches the target game scenario.

4. The method according to claim 1, wherein the target vibration impact factor is determined in the following manner:

acquiring a scenario identifier corresponding to the target game scenario and a terminal identifier of the target terminal;

acquiring, according to the scenario identifier, a game identifier corresponding to the target game scenario;

acquiring at least one of the following information of the target terminal according to the terminal identifier: physical information of the target terminal, motor information of the target terminal, a network delay factor related to the target terminal, and Bluetooth information of the target terminal; and determining the scenario identifier, the game identifier, and information about the target terminal obtained according to the terminal identifier as the target vibration impact factor.

5. The method according to claim 1, wherein the method further comprises:

adjusting the predefined vibration description file according to the target deviation data to obtain an adjusted predefined vibration description file; and transmitting the adjusted predefined vibration description file to the target terminal in response to a vibration instruction that is initiated by the target terminal and that is associated with the target game scenario, so that the target terminal generates, based on the adjusted predefined vibration description file, vibration that matches the target game scenario.

6. The method according to claim 5, wherein the adjusting the predefined vibration description file according to the target deviation data to obtain an adjusted predefined vibration description file comprises:

determining a deviation cancellation factor according to the target deviation data; and performing adjustment processing on the predefined vibration description file based on the deviation cancellation factor, to obtain the adjusted predefined vibration description file.

7. The method according to claim 5, wherein the transmitting the adjusted predefined vibration description file to the target terminal in response to a vibration instruction that is initiated by the target terminal and that is associated with the target game scenario, so that the target terminal generates, based on the adjusted predefined vibration description file, vibration that matches the target game scenario comprises:

invoking a target interface in response to vibration instructions that are initiated by a plurality of target terminals and that are associated with the target game scenario, so as to perform format protocol conversion on the adjusted predefined vibration description file by using the target interface, to obtain a unified-format predefined vibration description file; and transmitting the unified-format predefined vibration description file to the plurality of target terminals, so that after parsing the adjusted predefined vibration description file, the target terminals generate vibration that matches the target game scenario.

8. An electronic device, comprising:
a processor; and a memory, configured to store executable instructions of the processor, the processor being configured to perform a terminal vibration evaluation method in a game scenario by executing the executable instructions, the method including:

acquiring an actual vibration curve of a target terminal when a target game scenario is displayed on the target terminal;

acquiring a predefined vibration description file associated with the target game scenario, and determining a predefined vibration curve associated with the display of the target game scenario on the target terminal according to the predefined vibration description file;

determining target deviation data between the actual vibration curve and the predefined vibration curve according to a target vibration impact factor associated with the target terminal and the target game scenario; and determining, according to the target deviation data, whether vibration of the target terminal matches the target game scenario.

9. The electronic device according to claim 8, wherein the determining target deviation data between the actual vibration curve and the predefined vibration curve comprises:

determining a target fitting parameter according to the actual vibration curve and the predefined vibration curve, and using the target fitting parameter as the target deviation data.

10. The electronic device according to claim 9, wherein the determining a target fitting parameter according to the actual vibration curve and the predefined vibration curve comprises:

determining one or more of a delay indicator parameter, a trailing indicator parameter, a frequency deviation indicator parameter, and an intensity deviation indicator parameter according to the actual vibration curve and the predefined vibration curve; and the determining, according to the target deviation data, whether vibration of the target terminal matches the target game scenario comprises:

determining a vibration overall evaluation indicator value according to one or more of the delay indicator parameter, the trailing indicator parameter, the frequency deviation indicator parameter, and the intensity deviation indicator parameter; and determining, according to the vibration overall evaluation indicator value, whether the vibration of the target terminal matches the target game scenario.

11. The electronic device according to claim 8, wherein the target vibration impact factor is determined in the following manner:

acquiring a scenario identifier corresponding to the target game scenario and a terminal identifier of the target terminal;

acquiring, according to the scenario identifier, a game identifier corresponding to the target game scenario;

acquiring at least one of the following information of the target terminal according to the terminal identifier: physical information of the target terminal, motor information of the target terminal, a network delay factor related to the target terminal, and Bluetooth information of the target terminal; and determining the scenario identifier, the game identifier, and information about the target terminal obtained according to the terminal identifier as the target vibration impact factor.

12. The electronic device according to claim 8, wherein the method further comprises:
- adjusting the predefined vibration description file according to the target deviation data to obtain an adjusted predefined vibration description file; and
- transmitting the adjusted predefined vibration description file to the target terminal in response to a vibration instruction that is initiated by the target terminal and that is associated with the target game scenario, so that the target terminal generates, based on the adjusted predefined vibration description file, vibration that matches the target game scenario.

13. The electronic device according to claim 12, wherein the adjusting the predefined vibration description file according to the target deviation data to obtain an adjusted predefined vibration description file comprises:
- determining a deviation cancellation factor according to the target deviation data; and
- performing adjustment processing on the predefined vibration description file based on the deviation cancellation factor, to obtain the adjusted predefined vibration description file.

14. The electronic device according to claim 12, wherein the transmitting the adjusted predefined vibration description file to the target terminal in response to a vibration instruction that is initiated by the target terminal and that is associated with the target game scenario, so that the target terminal generates, based on the adjusted predefined vibration description file, vibration that matches the target game scenario comprises:
- invoking a target interface in response to vibration instructions that are initiated by a plurality of target terminals and that are associated with the target game scenario, so as to perform format protocol conversion on the adjusted predefined vibration description file by using the target interface, to obtain a unified-format predefined vibration description file; and
- transmitting the unified-format predefined vibration description file to the plurality of target terminals, so that after parsing the adjusted predefined vibration description file, the target terminals generate vibration that matches the target game scenario.

15. A non-transitory computer-readable storage medium, storing executable instructions, the executable instructions, when executed by a processor of an electronic device, causing the electronic device to perform a terminal vibration evaluation method in a game scenario, the method including:
- acquiring an actual vibration curve of a target terminal when a target game scenario is displayed on the target terminal;
- acquiring a predefined vibration description file associated with the target game scenario, and determining a predefined vibration curve associated with the display of the target game scenario on the target terminal according to the predefined vibration description file;
- determining target deviation data between the actual vibration curve and the predefined vibration curve according to a target vibration impact factor associated with the target terminal and the target game scenario; and
- determining, according to the target deviation data, whether vibration of the target terminal matches the target game scenario.

16. The non-transitory computer-readable storage medium according to claim 15, wherein the determining target deviation data between the actual vibration curve and the predefined vibration curve comprises:
- determining a target fitting parameter according to the actual vibration curve and the predefined vibration curve, and using the target fitting parameter as the target deviation data.

17. The non-transitory computer-readable storage medium according to claim 15, wherein the determining target deviation data between the actual vibration curve and the predefined vibration curve comprises:
- determining the target deviation data between the actual vibration curve and the predefined vibration curve according to a target vibration impact factor associate with the target terminal.

18. The non-transitory computer-readable storage medium according to claim 15, wherein the method further comprises:
- adjusting the predefined vibration description file according to the target deviation data to obtain an adjusted predefined vibration description file; and
- transmitting the adjusted predefined vibration description file to the target terminal in response to a vibration instruction that is initiated by the target terminal and that is associated with the target game scenario, so that the target terminal generates, based on the adjusted predefined vibration description file, vibration that matches the target game scenario.

* * * * *